US010199765B2

(12) United States Patent
Gao et al.

(10) Patent No.: US 10,199,765 B2
(45) Date of Patent: Feb. 5, 2019

(54) SLEEVE ASSEMBLY TO CONNECT A CABLE USING A CABLE CONNECTOR TO A DEVICE CONNECTOR DISPOSED IN A CABINET SLEEVE OF A DEVICE

(71) Applicant: HUAWEI TECHNOLOGIES CO., LTD., Shenzhen, Guangdong (CN)

(72) Inventors: Feng Gao, Shanghai (CN); Qihua Wang, Shanghai (CN); Tao Qu, Shanghai (CN); Bin Shen, Shenzhen (CN); Yanmin Dai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/922,038

(22) Filed: Mar. 15, 2018

(65) Prior Publication Data

US 2018/0205173 A1 Jul. 19, 2018

Related U.S. Application Data

(63) Continuation of application No. PCT/CN2015/089711, filed on Sep. 16, 2015.

(51) Int. Cl.
*H01R 13/52* (2006.01)
*H01R 13/506* (2006.01)
(Continued)

(52) U.S. Cl.
CPC ....... *H01R 13/5202* (2013.01); *H01R 13/506* (2013.01); *H01R 13/52* (2013.01); *H01R 13/627* (2013.01); *H01R 13/639* (2013.01)

(58) Field of Classification Search
CPC .............. H01R 13/5202; H01R 13/506; H01R 13/627; H01R 13/629; H01R 13/639; H01R 13/52; H01R 13/6275; H01R 13/6584
(Continued)

(56) References Cited

U.S. PATENT DOCUMENTS 2,753,219 A * 7/1956 Matarese ............. A62C 31/005 239/456
3,951,504 A 4/1976 Clark
(Continued)

FOREIGN PATENT DOCUMENTS

CN 202004414 10/2011
CN 102694299 9/2012
(Continued)

OTHER PUBLICATIONS

International Search Report dated for Jun. 16, 2016 in corresponding International Patent Application No. PCT/CN2015/089711.
(Continued)

*Primary Examiner* — Harshad C Patel
(74) *Attorney, Agent, or Firm* — Staas & Halsey LLP

(57) ABSTRACT

A sleeve assembly is disclosed, including: a sealing rubber plug, a sleeve body, a locking nuts, and a fastening wrench. The sealing rubber plug includes a rubber plug body, a through hole is disposed in the rubber plug body, and a cable that needs to be inserted into a device can be inserted into the through hole. The sleeve body has two opposite ends, a sealing ring is disposed on one end of the sleeve body, and a hollow bolt head is disposed on the other end of the sleeve body. The sleeve assembly can implement a cable protection function when the device requires high-density cable routing. Surface space of the device is not occupied during cable mounting, and mounting efficiency is high.

13 Claims, 6 Drawing Sheets

(51) Int. Cl.
*H01R 13/627* (2006.01)
*H01R 13/639* (2006.01)

(58) Field of Classification Search
USPC ....... 439/345, 312, 341, 352, 353, 357, 368, 439/370, 372, 376, 385, 358
See application file for complete search history.

(56) References Cited

U.S. PATENT DOCUMENTS 6,273,756 B1 * 8/2001 Ward ................. H01R 13/6592 439/372
6,390,848 B1 5/2002 Murakami et al.
6,739,888 B2 * 5/2004 Kato ......................... B60L 3/00 439/157
7,322,845 B2 * 1/2008 Regnier ............. H01R 13/6275 439/352
7,581,978 B1 * 9/2009 Briant ................ H01R 13/6275 439/358
7,753,710 B2 * 7/2010 George .............. H01R 13/6275 439/352
7,850,477 B2 * 12/2010 Koyama ................ H01R 27/02 439/358
8,231,400 B2 * 7/2012 Phillips ................ G02B 6/4201 439/357
9,268,102 B2 * 2/2016 Daems ................. G02B 6/3809
9,270,048 B2 * 2/2016 Harwath ................ H01R 13/52
2003/0228788 A1 * 12/2003 Igarashi ............. H01R 13/6275 439/358
2011/0244710 A1 10/2011 Svelnis et al.
2012/0285741 A1 * 11/2012 Scholten .............. H02G 15/007 174/77 R
2017/0170596 A1 * 6/2017 Goossens ........... H01R 13/5202

FOREIGN PATENT DOCUMENTS

CN 204131077 1/2015
CN 204558773 8/2015
DE 19950337 5/2000
EP 2515384 10/2012
WO WO2015119788 8/2015

OTHER PUBLICATIONS

Extended European Search Report, dated May 30, 2018, in European Application No. 15903840.5 (9 pp.).
International Search Report, dated Jun. 16, 2016, in International Application No. PCT/CN2015/089711 (5 pp.).

* cited by examiner

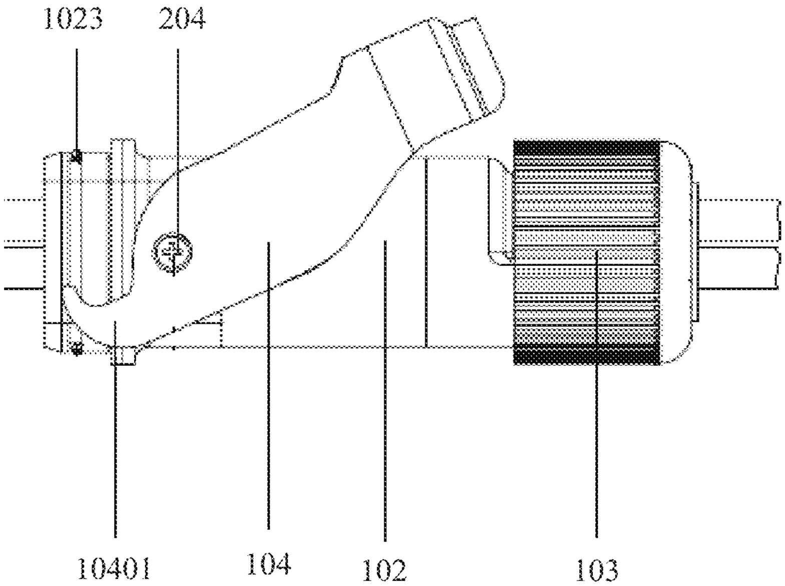
FIG. 7
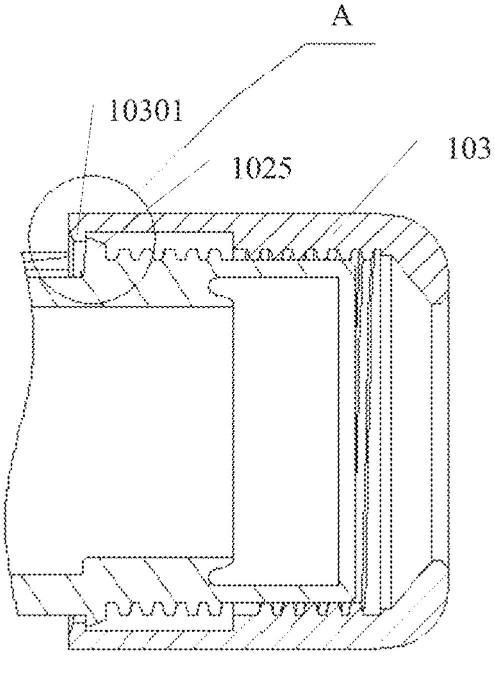
FIG. 8-a

FIG. 8-b

SLEEVE ASSEMBLY TO CONNECT A CABLE USING A CABLE CONNECTOR TO A DEVICE CONNECTOR DISPOSED IN A CABINET SLEEVE OF A DEVICE

CROSS-REFERENCE TO RELATED APPLICATIONS

This application is a continuation of International Application No. PCT/CN2015/089711, filed on Sep. 16, 2015, the disclosure of which is hereby incorporated by reference in its entirety.

TECHNICAL FIELD

Embodiments of the present invention relate to the field of technologies of cable routing protection parts, and in particular, to a sleeve assembly.

BACKGROUND

Multiple interconnected cables exist between communications devices, and waterproof design needs to be achieved on cable routing interfaces of the communications devices in an outdoor scenario. In existing conventional cable routing protection design, a cable is protected by using a PG waterproof connector. As the most commonly used cable waterproof structure in the industry, the PG waterproof connector is cost effective, and requires relatively large space for a mounting operation. An existing PG waterproof connector is connected to a cabinet of a communications device in a thread form. A thread head is fastened to the cabinet of the communications device. When a cable is being connected to the communications device, the cable is first inserted into the PG waterproof connector, and then a PG waterproof locking nut is tightened by using a tool, so as to implement connection protection. Because the thread head is fastened to the cabinet of the communications device and cannot move, when multiple cables need to be routed from the communications device, multiple PG waterproof connectors need to be disposed side by side. When multiple PG waterproof connectors are disposed side by side, the PG waterproof connectors horizontally occupy excessively large space. Consequently, on a surface of the communications device, smaller space is left for a mounting operation, and a mounting tool cannot approach the PG waterproof connectors to perform the mounting operation. Therefore, the existing PG waterproof connector is inapplicable to waterproof protection for routing of multiple cables.

In a current miniaturization trend of the communications device, because the existing PG waterproof connector needs to occupy relatively large surface space of the communications device when being mounted, the existing PG waterproof connector fails to meet a requirement of the communications device for high-density cable routing, and is becoming a bottleneck for modular miniaturization of the communications device.

SUMMARY

Embodiments of the present invention provide a sleeve assembly, so as to implement a cable protection function when a device requires high-density cable routing. Surface space of the device is not occupied during cable mounting, and mounting efficiency is high.

According to a first aspect, an embodiment of the present invention provides a sleeve assembly, and the sleeve assembly includes: a sealing rubber plug, a sleeve body, a locking nut, and a fastening wrench, where the sealing rubber plug includes: a rubber plug body, where a through hole is disposed in the rubber plug body, and a cable that needs to be inserted into a device can be inserted into the through hole;

the sleeve body has two opposite ends, a sealing ring is disposed on one end of the sleeve body, and a hollow bolt head is disposed on the other end of the sleeve body:

the fastening wrench is disposed on an outer surface of the sleeve body, the fastening wrench and the sleeve body are connected by using a rotating shaft, a hook is disposed on the fastening wrench, and a mounting ear is disposed on a cabinet sleeve of the device;

the cable is inserted into the sleeve body from a side of the end on which the bolt head is disposed, and protrudes from the sleeve body on a side of the end on which the sealing ring is disposed, the cable passes through the through hole in the sealing rubber plug after protruding from the sleeve body, and the cable is connected, by using a cable connector, to a device connector disposed in the cabinet sleeve after protruding from the sealing rubber plug;

the fastening wrench is separated from the outer surface of the sleeve body before the cable is connected to the device connector by using the cable connector, the sealing ring on the sleeve body is in contact with the cabinet sleeve after the cable connector is connected to the device connector, and after the fastening wrench is rotated towards the outer surface of the sleeve body, the fastening wrench is attached to the outer surface of the sleeve body, and the hook is bonded to the mounting ear; and the sealing ring on the sleeve body is in close contact with the cabinet sleeve after the fastening wrench is attached to the outer surface of the sleeve body; and the sealing rubber plug enters the bolt head on the sleeve body after the cable passes through the through hole in the sealing rubber plug, the locking nut is tightened by means of a coordinated connection between an internal thread of the locking nut and an external thread of the bolt head, the locking nut tightly wraps the sealing rubber plug after the locking nut is tightened, and a part of the sealing rubber plug protrudes from the locking nut.

With reference to the first aspect, in a first possible implementation of the first aspect, the sealing rubber plug further includes a stopper rod, the stopper rod is connected to the through hole in a pluggable manner, and the cable that needs to be inserted into the device can be inserted into the through hole after the stopper rod is removed from the through hole.

With reference to the first possible implementation of the first aspect, in a second possible implementation of the first aspect, at least two through holes are disposed on the rubber plug body, a quantity of cables that are inserted into the sleeve assembly is less than or equal to a quantity of the through holes, each cable is arranged in one through hole, a free through hole exists when the quantity of the cables is less than the quantity of the through holes, and the stopper rod is arranged in the free through hole.

With reference to any one of the first aspect, or the first or the second possible implementation of the first aspect, in a third possible implementation of the first aspect, a foolproof edge is further disposed on the fastening wrench, where the foolproof edge is attached to an outer surface that is of the sleeve body and that is adjacent to the side of the end of the bolt head after the cable is connected to the device connector by using the cable connector; and the foolproof edge is pressed against an inner surface of the locking nut when the locking nut is tightened by means of the coordinated connection between the internal thread of the locking nut and the external thread of the bolt head, the foolproof edge is detached from the inner surface of the locking nut after the locking nut is separated from the bolt head, and the fastening wrench can be pulled open from the outer surface of the sleeve body.

With reference to any one of the first aspect, or the first, the second, or the third possible implementation of the first aspect, in a fourth possible implementation of the first aspect, the sleeve body includes: a hollow tube structure surrounded by an upper surface, a left surface, a lower surface, and a right surface;

the fastening wrench is a U-shaped structure, the fastening wrench includes: a left hook portion, a right hook portion, and a wrench body, the wrench body is separately and fixedly connected to the left hook portion and the right hook portion, and hooks are disposed on both the left hook portion and the right hook portion; and the left hook portion and the left surface of the sleeve body are connected by using a rotating shaft, and the right hook portion and the right surface of the sleeve body are connected by using a rotating shaft.

With reference to the fourth possible implementation of the first aspect, in a fifth possible implementation of the first aspect, the foolproof edge is disposed on the wrench body.

With reference to any one of the first aspect, or the first, the second, or the third possible implementation of the first aspect, in a sixth possible implementation of the first aspect, the fastening wrench is a long-strip-shaped sheet structure, the hook is disposed on a long-strip end of the fastening wrench, and the fastening wrench and the outer surface of the sleeve body are connected by using a rotating shaft.

With reference to any one of the first aspect, or the first, the second, the third, the fourth, the fifth, or the sixth possible implementation of the first aspect, in a seventh possible implementation of the first aspect, the bolt head on the sleeve body is outwardly connected to a soft claw, the sealing rubber plug enters the soft claw when the locking nut is tightened, and the soft claw is compressed by the locking nut when the bolt head is screwed into the locking nut.

With reference to any one of the first aspect, or the first, the second, the third, the fourth, the fifth, the sixth, or the seventh possible implementation of the first aspect, in an eighth possible implementation of the first aspect, the sleeve assembly further includes: a lining, where the lining is located in the bolt head on the sleeve body, and the sealing rubber plug passes through the lining and then enters the locking nut when the locking nut is being tightened.

With reference to any one of the first aspect, or the first, the second, the third, the fourth, the fifth, the sixth, the seventh, or the eighth possible implementation of the first aspect, in a ninth possible implementation of the first aspect, the sleeve assembly further includes: an elastic sealing gasket, where the elastic sealing gasket is disposed on the side of the end that is of the sleeve body and on which the sealing ring is disposed, the elastic sealing gasket is in contact with the cabinet sleeve after the cable connector is connected to the device connector, and the elastic sealing gasket is pressed between the sleeve body and the cabinet sleeve after the fastening wrench is rotated downwards and attached to the outer surface of the sleeve body.

With reference to any one of the first aspect, or the first, the second, the third, the fourth, the fifth, the sixth, the seventh, the eighth, or the ninth possible implementation of the first aspect, in a tenth possible implementation of the first aspect, the sleeve assembly further includes: an anti-falling chain for a rubber plug, where a hanging hole is disposed on an outer surface that is of the sleeve body and close to the sealing ring; and the anti-falling chain for a rubber plug is connected to the sealing rubber plug, and the anti-falling chain for a rubber plug is hung in the hanging hole on the sleeve body.

With reference to any one of the first aspect, or the first, the second, the third, the fourth, the fifth, the sixth, the seventh, the eighth, the ninth, or the tenth possible implementation of the first aspect, in an eleventh possible implementation of the first aspect, a convex rib is disposed on the inner surface of the locking nut:

a flange is further disposed on the side of the end on which the bolt head is disposed on the outer surface of the sleeve body; and the locking nut is clamped, by using the flange and the convex rib, to the side of the end that is of the sleeve body and on which the bolt head is disposed.

With reference to any one of the first aspect, or the second, the third, the fourth, the fifth, the sixth, the seventh, the eighth, the ninth, the tenth, or the eleventh possible implementation of the first aspect, in a twelfth possible implementation of the first aspect, the sleeve assembly further includes: an anti-falling chain for a stopper rod, where the anti-falling chain for a stopper rod is separately connected to the stopper rod and the sealing rubber plug; and the anti-falling chain for a stopper rod is configured to: when the stopper rod is removed from the sealing rubber plug, connect the removed stopper rod and the sealing rubber plug.

It can be learned from the foregoing technical solutions that the embodiments of the present invention have the following advantages:

In the embodiments of the present invention, the sleeve assembly includes: the sealing rubber plug, the sleeve body, the locking nut, and the fastening wrench, where the sealing rubber plug includes the through hole and the pluggable stopper rod, and the cable can be mounted after the stopper rod is removed. The sleeve body has two opposite ends, a sealing ring is disposed on one end of the sleeve body, and a hollow bolt head is disposed on the other end of the sleeve body. Because of the rotating shaft, the fastening wrench can be rotated around the sleeve body. In addition, the hook is disposed on the fastening wrench, and the mounting ear is disposed on the cabinet sleeve of the device. In the embodiments of the present invention, when the cable is being mounted, the cable that needs to be mounted first passes through the sleeve body, and then passes through the sealing rubber plug. Then the cable is connected to the device connector by using the cable connector. The sleeve assembly provided in the embodiments of the present invention can provide waterproof, dustproof, and salt spray-proof functions. The sleeve assembly is tightly connected to the cabinet sleeve of the device in the following manner:

The fastening wrench is open before the cable is connected to the device connector by using the cable connector. After the cable connector is connected to the device connector, the sleeve body is inserted into the cabinet sleeve, and is sealed with the cabinet sleeve by using the sealing ring. The fastening wrench is rotated towards the outer surface of the sleeve body, and the hook on the fastening wrench is bonded to the mounting ear on the cabinet sleeve of the device. After the sleeve body is inserted into the cabinet sleeve, the sealing rubber plug enters the bolt head on the sleeve body. The locking nut is tightened to compress the sealing rubber plug, so as to implement protection after the cable is connected. In the embodiments of the present invention, the fastening wrench is used for sealing and connection between the sleeve assembly and the cabinet sleeve of the device, and the locking nut is used for sealing and connection between the cable and the sealing rubber plug. Because the sleeve body is separated from the cabinet sleeve of the device during cable connection in the embodiments of the present invention, mounting space for the sleeve body is not limited to a surface as the device. Therefore, according to the sleeve assembly provided in the embodiments of the present invention, cable mounting does not require that a mounting tool approaches the surface of the device, and excessively large space does not need to be occupied for the mounting operation. Therefore, the sleeve assembly provided in the embodiments of the present invention can meet a high-density cable routing requirement of the device.

BRIEF DESCRIPTION OF DRAWINGS

FIG. 7 is a schematic diagram of a composition structure of another fastening wrench according to an embodiment of the present invention;

FIG. 8-*b* is a locally enlarged cross-sectional schematic diagram of a locking nut according to an embodiment of the present invention.

DESCRIPTION OF EMBODIMENTS

The embodiments of the present invention provide a sleeve assembly to implement cable protection when a device requires high-density cable routing. Mounting does not need to be performed on a surface of the device, and therefore mounting space is saved.

To make the invention objectives, features, and advantages of the present invention clearer and more comprehensible, the following describes the technical solutions in the embodiments of the present invention with reference to the accompanying drawings in the embodiments of the present invention. Apparently, the embodiments described in the following are merely some rather than all of the embodiments of the present invention. All other embodiments obtained by persons skilled in the art based on the embodiments of the present invention shall fall within the protection scope of the present invention.

In the specification, claims, and the foregoing accompanying drawings of the present invention, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Details are described in the following.

Figure 1:
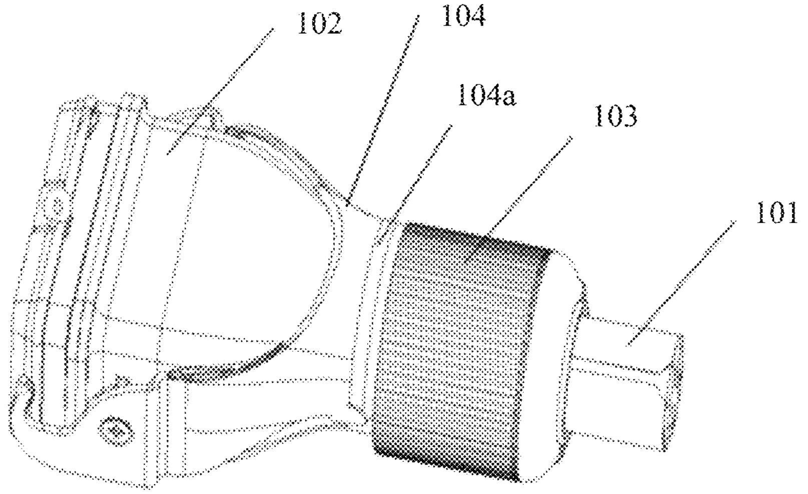
FIG. 1 is a schematic diagram of a combined usage state of a sleeve assembly according to an embodiment of the present invention.

A sleeve assembly provided in an embodiment of the present invention may be applied to waterproof protection for cable routing of a device and may also be used for cable protection, for example, dustproof and salt spray-proof protection, in a harsh environment. First, referring to FIG. 1, FIG. 1 is a schematic diagram of a combined usage state of a sleeve assembly according to an embodiment of the present invention. The sleeve assembly includes: a sealing rubber plug 101, a sleeve body 102, a locking nut 103, and a fastening wrench 104. After the sealing rubber plug 101, the sleeve body 102, the locking nut 103, and the fastening wrench 104 that are included in the sleeve assembly are combined together, a cable is mounted in the sealing rubber plug 101, the sealing rubber plug 101 is inserted into the sleeve body 102, a part of the sealing rubber plug 101 protrudes from the locking nut 103, and the fastening wrench 104 is attached to an outer surface of the sleeve body 102. The following describes each component of the sleeve assembly.

The sealing rubber plug 101 includes: a rubber plug body. A through hole is disposed in the rubber plug body. A cable that needs to be inserted into a device can be inserted into the through hole. The cable is arranged in the through hole in the rubber plug body. The sealing rubber plug protects the cable. It should be noted that, in this embodiment of the present invention, rubber plug bodies with different quantities of through holes may be selected according to a quantity of cables to be mounted. Therefore, the sealing rubber plug can meet mounting requirements of different quantities of cables.

In some embodiments of the present invention, the sealing rubber plug may further include a stopper rod. The stopper rod is connected to the through hole in a pluggable manner. After the stopper rod is removed from the through hole, an external cable can be inserted into the through hole. In this embodiment of the present invention, the through hole is disposed in the sealing rubber plug, the cable is arranged in the through hole of the sealing rubber plug, the sealing rubber plug wraps the cable after the cable is inserted into the sealing rubber plug, and a part of the sealing rubber plug protrudes from the locking nut. In this way, the cable is tightly wrapped to implement waterproof, dust proof, and salt spray-proof protection.

It should be noted that, in this embodiment of the present invention, one through hole or at least two through holes may be disposed in the sealing rubber plug. For example, N through holes may be disposed in the sealing rubber plug, where N is a natural number, and a specific value of N is determined by a cable routing requirement of the device. A pluggable stopper rod is disposed in each through hole. When a cable needs to be inserted into a through hole, a stopper rod is removed from the through hole first. When a free through hole exists, a stopper rod for the through hole remains in the through hole. After the cable is inserted into the sealing rubber plug, the stopper rod in the free through hole implements a sealing function. The sealing rubber plug provided in this embodiment of the present invention can meet cable routing requirements of different quantities of cables by disposing the pluggable stopper rod, so that the sealing rubber plug is applicable to a scenario of high-density cable routing for the device. In addition, the sealing rubber plug is applicable to a scenario of subsequent capacity expansion with an additional cable.

Figure 2:
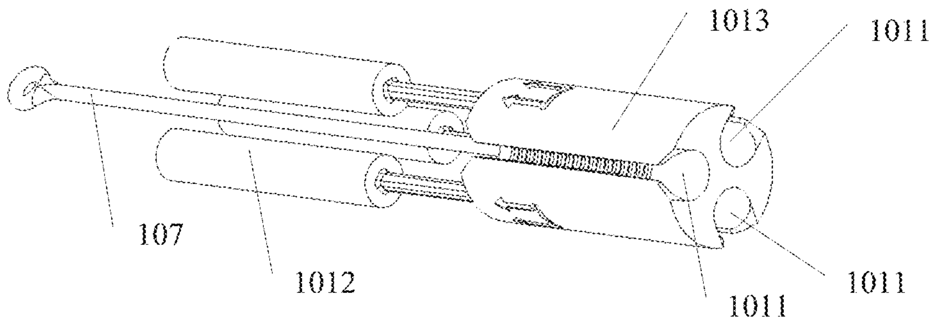
FIG. 2 is a schematic structural diagram of a sealing rubber plug according to an embodiment of the present invention.

In an embodiment of the present invention, as shown in FIG. 2, FIG. 2 is a schematic structural diagram of a sealing rubber plug according to an embodiment of the present invention. At least two through holes 1011 are disposed in a rubber plug body 1013. A quantity of cables inserted into a sleeve assembly is less than or equal to a quantity of the through holes. Each cable is arranged in one through hole. When the quantity of the cables is less than the quantity of the through holes, a free through hole exists, and a stopper rod 1012 is arranged in the free through hole.

In some embodiments of the present invention, the sealing rubber plug may include one through hole, and a pluggable stopper rod is disposed in the through hole. Alternatively, the sealing rubber plug may include multiple through holes and pluggable stopper rods. For example, the quantity of the through holes may be 2, 3, 4, or more. The quantity of the through holes in the sealing rubber plug may be specifically set according to a requirement of an application scenario. In this embodiment of the present invention, each through hole may be configured to arrange one cable. When the quantity of the cables is equal to the quantity of the through holes, no through hole needs to be filled with a stopper rod. When the quantity of the cables is less than the quantity of the through holes, a free through hole exists, and a stopper rod may be arranged in the free through hole. The stopper rod can be flexibly inserted and removed. When enough cables pass through the sealing rubber plug, no stopper rod is required. The sleeve assembly in this embodiment of the present invention can meet a requirement of high-density cable routing efficiency. When a relatively small quantity of cables pass through the sealing rubber plug, each cable fills one through hole, and some free through holes without an inserted cable definitely exist. A free through hole is filled with a stopper rod to meet a sealing requirement. As shown in FIG. 2, that three through holes are disposed in one sealing rubber plug is used as an example. The three through holes form a 120-degree angle with one another. It should be noted that, in this embodiment of the present invention, four or more through holes may be designed in the sealing rubber plug. These through holes may be radially designed around a central axis of the sealing rubber plug. In actual application, three or fewer cables usually need to be routed from a communications device. Therefore, three through holes are preferably disposed in the sealing rubber plug, but a design solution with another quantity of through holes may also be used in this embodiment of the present invention.

Figure 3:
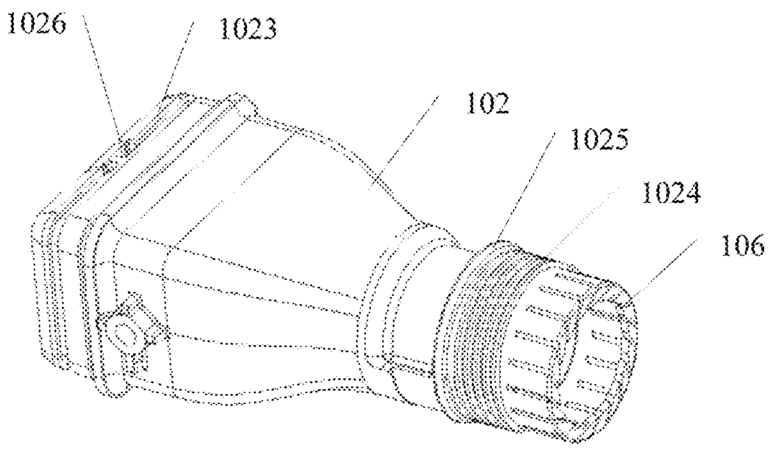
FIG. 3 is a schematic structural diagram of a sleeve body according to an embodiment of the present invention.

In an embodiment of the present invention, as shown in FIG. 3, FIG. 3 is a schematic structural diagram of a sleeve body according to an embodiment of the present invention. A sleeve body 102 has two opposite ends, a sealing ring 1023 is disposed on one end of the sleeve body, and a hollow bolt head 1024 is disposed on the other end of the sleeve body.

In this embodiment of the present invention, a fastening wrench is disposed on an outer surface of the sleeve body. The fastening wrench and the sleeve body are connected by using a rotating shaft. For example, the fastening wrench can be rotated up and down around the outer surface of the sleeve body. Specifically, the rotating shaft may be a screw. A hook is disposed on the fastening wrench. A mounting ear is disposed on a cabinet sleeve of a device. The fastening wrench is configured to connect a sleeve assembly and the cabinet sleeve of the device. A hook is disposed on the fastening wrench. A mounting ear is disposed on the cabinet sleeve. The fastening wrench can be rotated around the outer surface of the sleeve body. Compared with a mounting operation completed by screwing a PG waterproof connector onto a thread head fastened on a cabinet of a device in the prior art, a bonding operation of the hook and the mounting ear in this embodiment of the present invention is easier to implement. In addition, such an operation manner of the fastening wrench does not require excessively large space for a mounting operation, and therefore is applicable to a scenario in which a cabinet of a device has small surface space.

In this embodiment of the present invention, the fastening wrench is disposed on the outer surface of the sleeve body. The fastening wrench can tightly connect the sleeve assembly and the cabinet sleeve of the device by using bonding design of the hook and the mounting ear, so as to prevent a person or wind from separating the sleeve assembly from the cabinet sleeve of the device when a cable is clamped. The fastening wrench is disposed on the sleeve assembly. The hook on the fastening wrench and the mounting ear on the cabinet sleeve of the device are combined fastening parts that are in conjunction with each other. Such a structure is solid and convenient for use. For example, the fastening wrench can be easily rotated downwards, so that the fastening wrench is attached to the outer surface of the sleeve body. The fastening wrench can firmly press the sleeve assembly and the cabinet sleeve of the device together, so as to implement a function of sealing and connection between the sleeve assembly and the cabinet sleeve of the device. Therefore, the sleeve assembly provided in this embodiment of the present invention has better waterproof, dustproof, and salt spray-proof protection functions.

It should be noted that, in some embodiments of the present invention, the fastening wrench and the sleeve body are connected by using a rotating shaft. For example, a screw is used as the rotating shaft. The fastening wrench may be connected to the outer surface of the sleeve body by a screw, so as to prevent the fastening wrench from falling from the sleeve body.

In some embodiments of the present invention, as shown in FIG. 1, FIG. 1 is a schematic diagram of a combined usage state of a sleeve assembly according to an embodiment of the present invention. In addition to the foregoing structure characteristics, the fastening wrench 104 further includes a foolproof edge **104*a*. The foolproof edge 104*a* is attached to an outer surface that is of the sleeve body and that is adjacent to a side of the end of the bolt head after the cable is connected to a device connector by using a cable connector. The foolproof edge 104*a* is pressed against an inner surface of the locking nut when the locking nut is tightened by means of the coordinated connection between an internal thread of the locking nut and the external thread of the bolt head. The fastening wrench 104 can be opened from the outer surface of the sleeve body only when the foolproof edge 104*a*** is detached from the locking nut after the locking nut is loosened.

As shown in FIG. 1, the fastening wrench 104 is attached to the outer surface that is of the sleeve body and that is adjacent to the side of the end of the bolt head. The foolproof **104*a*** disposed on the fastening wrench is also attached to the outer surface that is of the sleeve body and that is adjacent to the side of the end of the bolt head. When the locking nut

103 is tightened, the foolproof edge 104*a* is pressed into the locking nut 103. The foolproof edge 104*a* is detached from the locking nut after the locking nut 103 is separated from the bolt head, and the fastening wrench 104 can be pulled open from the outer surface of the sleeve body 102. The foolproof edge is disposed on the fastening wrench, and the foolproof edge is pressed into the locking nut after the cable and the sleeve assembly are mounted, so as to prevent the fastening wrench from being opened by accident, and therefore prevent the cable from being pulled accidentally. Therefore, safety performance of the sleeve assembly in this embodiment of the present invention can be improved.

Figure 4:
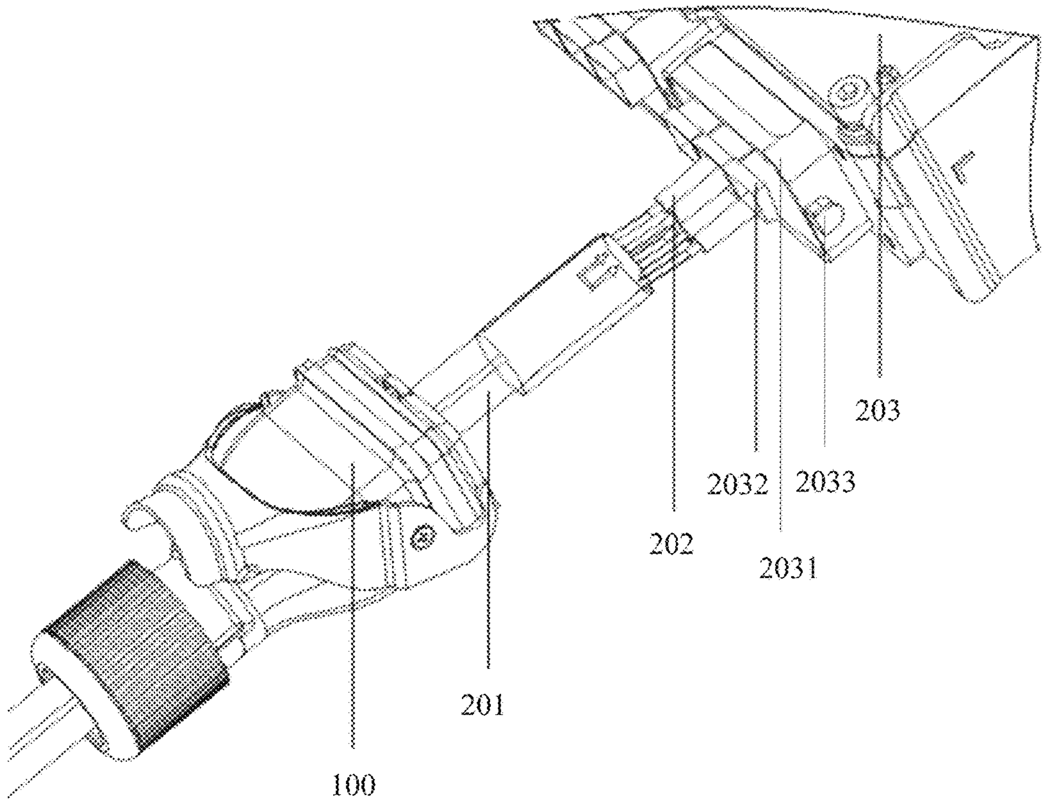
FIG. 4 is a schematic diagram of a procedure of mounting a cable in a sleeve assembly according to an embodiment of the present invention.
Figure 5:
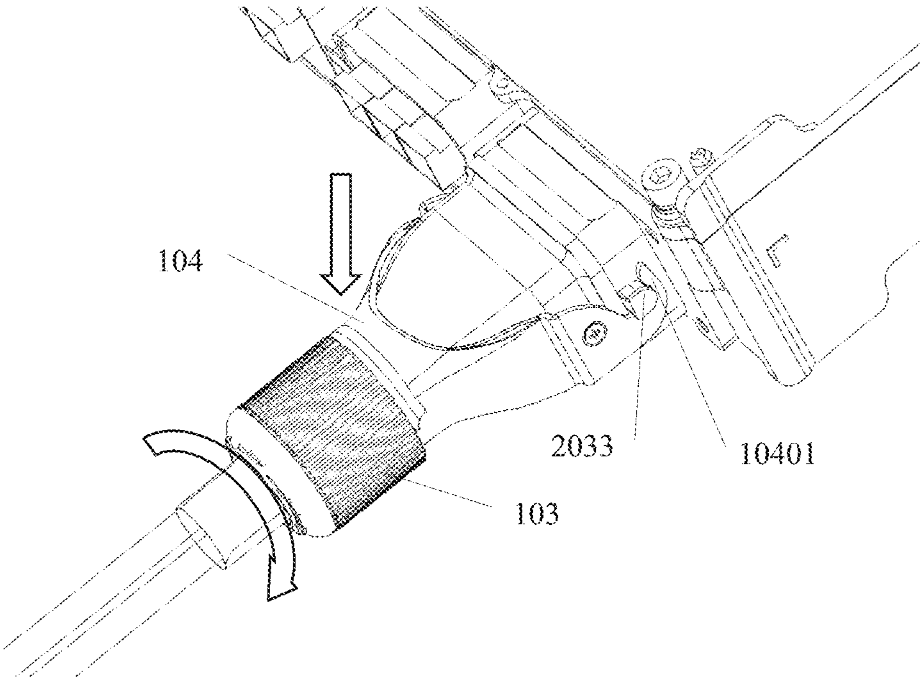
FIG. 5 is a schematic diagram of a usage state of a sleeve assembly after cable mounting according to an embodiment of the present invention.

In an embodiment of the present invention, as shown in FIG. 4, FIG. 4 is a schematic diagram of a procedure of mounting a cable in a sleeve assembly according to an embodiment of the present invention. As shown in FIG. 5, FIG. 5 is a schematic diagram of a usage state of a sleeve assembly after cable mounting according to an embodiment of the present invention. A specific procedure of mounting a cable into a sleeve assembly 100 is as follows:

A cable 201 is inserted into a sleeve body from a side of an end on which a bolt head is disposed, and protrudes from the sleeve body on a side of an end on which a sealing ring is disposed. The cable 201 passes through a through hole in a sealing rubber plug after protruding from the sleeve body. The cable 201 is connected, by using a cable connector 202, to a device connector 2032 disposed in a cabinet sleeve 2031 of a device 203 after protruding from the sealing rubber plug. The cable connector 202 is a protection target of the sleeve assembly 100. The cable connector 202 and the device connector 2032 are a pluggable connection structure. The cable enters the device 203 from the cabinet sleeve 2031 after the cable connector 202 is connected to the device connector 2032.

The fastening wrench 104 is open before the cable 201 is connected to the device connector 2032 by using the cable connector 202. After the cable connector 202 is connected to the device connector 2032, the sealing ring on the sleeve body is in contact with the cabinet sleeve 2031. The fastening wrench 104 is rotated towards an outer surface of the sleeve body. When the fastening wrench 104 is attached to the outer surface of the sleeve body, a hook 10401 is bonded to a mounting ear 2033. After the fastening wrench 104 is rotated downwards and attached to the outer surface of the sleeve body, the sealing ring on the sleeve body is in close contact with the cabinet sleeve.

After the cable 201 passes through the through hole in the sealing rubber plug, the sealing rubber plug enters the bolt head on the sleeve body. A locking nut 103 is tightened by means of a coordinated connection between an internal thread of the locking nut 103 and an external thread of the bolt head. After the locking nut 103 is tightened, the locking nut 103 tightly wraps the sealing rubber plug, and a part of the sealing rubber plug protrudes from the locking nut.

It can be learned from the procedure of mounting the cable in the sleeve assembly and a mounting result in this embodiment of the present invention that a mounting operation can be performed in space away from the device when the cable is being mounted in the sleeve assembly. In FIG. 4, the cable can be mounted in the sleeve assembly in space away from a cabinet surface of the device. Therefore, quite large operation space may exist, so that the cable can be easily connected to the device connector by using the cable connector after the cable passes through the sleeve assembly. After the cable is mounted in the sleeve assembly, as shown in FIG. 5, the fastening wrench 104 can connect the sleeve assembly and the cabinet sleeve of the device in a sealing manner after the fastening wrench is rotated and the hook 10401 is bonded to the mounting ear 2033.

In this embodiment of the present invention, the sleeve body may be a plastic hollow tube structure. The sleeve body 102 is used for sealing protection of a cable. After the cable passes through the sleeve body, the cable connector and the device connector are interconnected, so as to complete connection between the cable and the device. It should be noted that the sleeve body may be further made of a material such as metal to meet waterproof, dustproof, and salt spray-proof requirements. The sleeve body is designed in an integrated manner or by combining separate parts. No limitation is imposed herein.

In some embodiments of the present invention, a bolt head is disposed on one end of the sleeve body. The bolt head is designed as a hollow cylinder. An external thread is disposed on an outer surface of the bolt head, an internal thread is disposed on an inner surface of the locking nut, and the locking nut can be tightened on the sleeve body by means of a coordinated connection between the internal thread and the external thread, so as to implement a tight connection between the sealing rubber plug and the locking nut, and meet the waterproof, dustproof, and salt spray-proof requirements.

Figure 6:
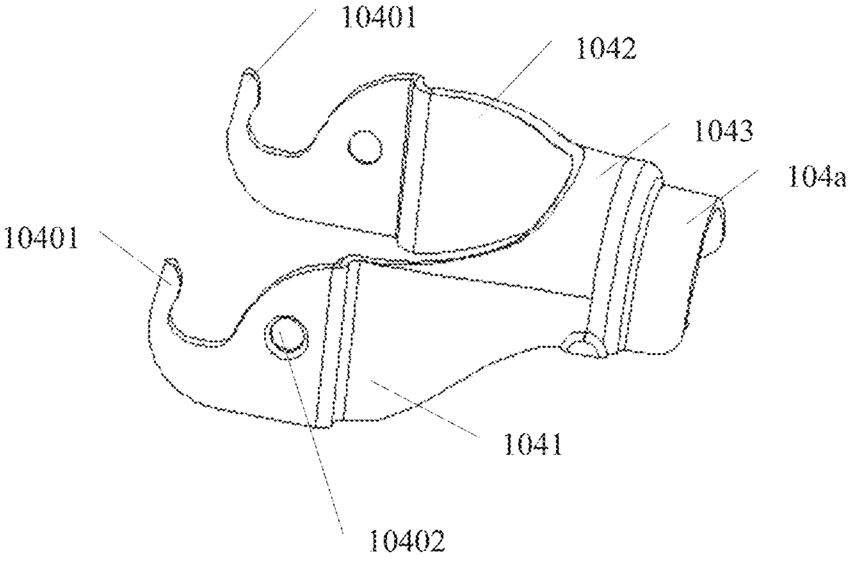
FIG. 6 is a schematic diagram of a composition structure of a fastening wrench according to an embodiment of the present invention.

In the foregoing embodiments, a position relationship between the fastening wrench and the sleeve body and a function of the fastening wrench are described. The following describes a composition structure of the fastening wrench in detail. In some embodiments of the present invention, a sleeve body includes a hollow tube structure surrounded by an upper surface, a left surface, a lower surface, and a right surface. Referring to FIG. 6. FIG. 6 is a schematic diagram of a composition structure of a fastening wrench according to an embodiment of the present invention. The fastening wrench is a U-shaped structure. The fastening wrench 104 includes: a left hook portion 1041, a right hook portion 1042, a wrench body 1043, and a foolproof edge 104*a*. The wrench body 1043 is separately and fixedly connected to the left hook portion 1041 and the right hook portion 1042. Hooks 10401 are disposed on the left hook portion 1041 and the right hook portion 1042. The left hook portion 1041 and the right hook portion 1042 are designed as a symmetrical structure. Circular holes 10402 are disposed on the left hook portion 1041 and the right hook portion 1042. The left hook portion 1041 and the left surface of the sleeve body are connected by using a rotating shaft. The right hook portion 1042 and the right surface of the sleeve body are connected by using a rotating shaft. The rotating shaft passes through the circular hole 10402 on the left hook portion 1041, and then is fastened to the left surface of the sleeve body. The rotating shaft passes through the circular hole on the right hook portion 1042, and then is fastened to the right surface of the sleeve body.

It should be noted that, in this embodiment of the present invention, the U-shape structure of the fastening wrench coordinates with surfaces on three sides of the sleeve body, and the fastening wrench can be rotated up and down around the surfaces of the sleeve body. In this way, the sleeve assembly and a cabinet sleeve of a device are connected in a sealing manner, or the sleeve assembly is removed from the cabinet sleeve of the device. It should be noted that, in the foregoing embodiment, the fastening wrench may be rotated up and down around the outer surface of the sleeve body, and being rotated up and down described herein is only a rotation direction of the fastening wrench when a cable is mounted to the device in a horizontal direction. What is not limited is that the rotation direction of the fastening wrench changes with a change in a mounting direction of the cable. The description herein is used as an example and does not impose a limitation to the present invention.

In some other embodiments of the present invention, referring to FIG. 7, FIG. 7 is a schematic diagram of a composition structure of another fastening wrench according to an embodiment of the present invention. A fastening wrench 104 is a long-strip-shaped sheet structure. A hook 10401 is disposed on a long-strip end of the fastening wrench 104. The fastening wrench 104 and an outer surface of a sleeve body 102 are connected by using a rotating shaft 204. The fastening wrench provided in this embodiment of the present invention may be a long-strip-shaped sheet structure disposed on one side of the sleeve body. Such a fastening wrench of the long-strip-shaped sheet structure can fasten the sleeve assembly to a cabinet sleeve of a device. In addition, in this embodiment of the present invention, the fastening wrench of the long-strip-shaped sheet structure may be replaced by two fastening wrenches that are symmetrical to each other and disposed respectively on a left side and a right side of the sleeve body. Two mounting ears that are symmetrical to each other are disposed respectively on a left side and a right side of the cabinet sleeve of the device. Each mounting ear is bonded to a hook of one fastening wrench, so that the left and right fastening wrenches of the long-strip-shaped sheet structure further fasten the sleeve assembly to the cabinet sleeve of the device.

It should be noted that, the fastening wrench in this embodiment of the present invention may be made of hard metal, for example, a steel structure may be used; and an external shape of the fastening wrench may have various implementations, provided that a hook that can be bonded to a mounting ear is disposed on a front end of the fastening wrench.

As shown in FIG. 3, in some embodiments of the present invention, the bolt head on the sleeve body is outwardly connected to a soft claw 106. The sealing rubber plug enters the soft claw 106 when the locking nut is tightened. The soft claw is compressed by the locking nut when the bolt head is screwed into the locking nut. The soft claw can further fasten the sealing rubber plug, so that the sleeve assembly provided in the embodiments of the present invention has waterproof, dustproof, and salt spray-proof functions.

As shown in FIG. 2, in some embodiments of the present invention, the sleeve assembly further includes: an anti-falling chain 107 for a rubber plug. As shown in FIG. 3, a hanging hole 1026 is disposed on a surface that is of the sleeve body 102 and that is adjacent to the end on which the sealing ring 1023 is disposed. The anti-falling chain 107 for a rubber plug is connected to the sealing rubber plug 101. The anti-falling chain 107 for a rubber plug is hung in the hanging hole 1026 on the sleeve body 102.

In the embodiments of the present invention, the anti-falling chain for a rubber plug may be further connected to the sealing rubber plug on the sleeve assembly. The anti-falling chain for a rubber plug can be hung in the hanging hole on the sleeve body, so as to prevent the sealing rubber plug from falling when the cable is being mounted in the sleeve assembly. Therefore, the sleeve assembly provided in the embodiments of the present invention has higher anti-falling performance during working at heights.

In some embodiments of the present invention, the sleeve assembly further includes: an anti-falling chain for a stopper rod. The anti-falling chain for a stopper rod is separately connected to the stopper rod and the sealing rubber plug. The anti-falling chain for a stopper rod is configured to: when the stopper rod is removed from the sealing rubber plug, connect the removed stopper rod and the sealing rubber plug. The anti-falling chain for a stopper rod allows the sleeve assembly provided in the embodiments of the present invention to have higher anti-falling performance during working at heights.

Figure 8:
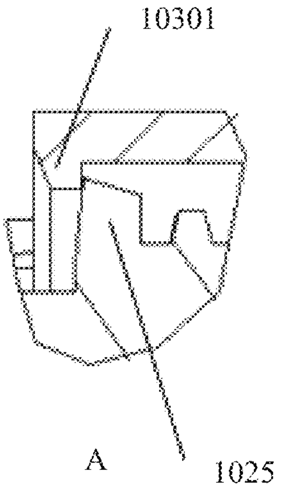
FIG. 8-*a* is a schematic sectional view of a locking nut used along with a bolt head according to an embodiment of the present invention.

In some embodiments of the present invention, as shown in FIG. 8-*a*, FIG. 8-*a* is a schematic sectional view of a locking nut used along with a bolt head according to an embodiment of the present invention. As shown in FIG. 8-*b*, FIG. 8-*b* is a locally enlarged cross-sectional schematic diagram of a locking nut according to an embodiment of the present invention. FIG. 8-*b* is an enlarged diagram of a part A in FIG. 8-*a*. A convex rib 10301 is disposed on the inner surface of the locking nut 103. A flange 1025 is further disposed on the side of the end on which the bolt head is disposed on the outer surface of the sleeve body 102. FIG. 3 also shows the flange 1025. The locking nut 103 is clamped, by the flange 1025 by using the convex rib 10301, to the side of the end that is of the sleeve body and on which the bolt head is disposed, so as to prevent the locking nut from falling during operation. The convex rib and the flange allow the sleeve assembly provided in the embodiments of the present invention to have higher anti-falling performance during working at heights.

It should be noted that, in the foregoing embodiments of the present invention, the anti-falling chain for a rubber plug, the anti-falling chain for a stopper rod, a convex rib, and a flange may be disposed on the sleeve assembly. An integrated anti-falling function can be implemented for the sleeve assembly by using these parts, so that all movable parts in the sleeve assembly have anti-falling design, thereby ensuring security during working at heights.

Figure 9:
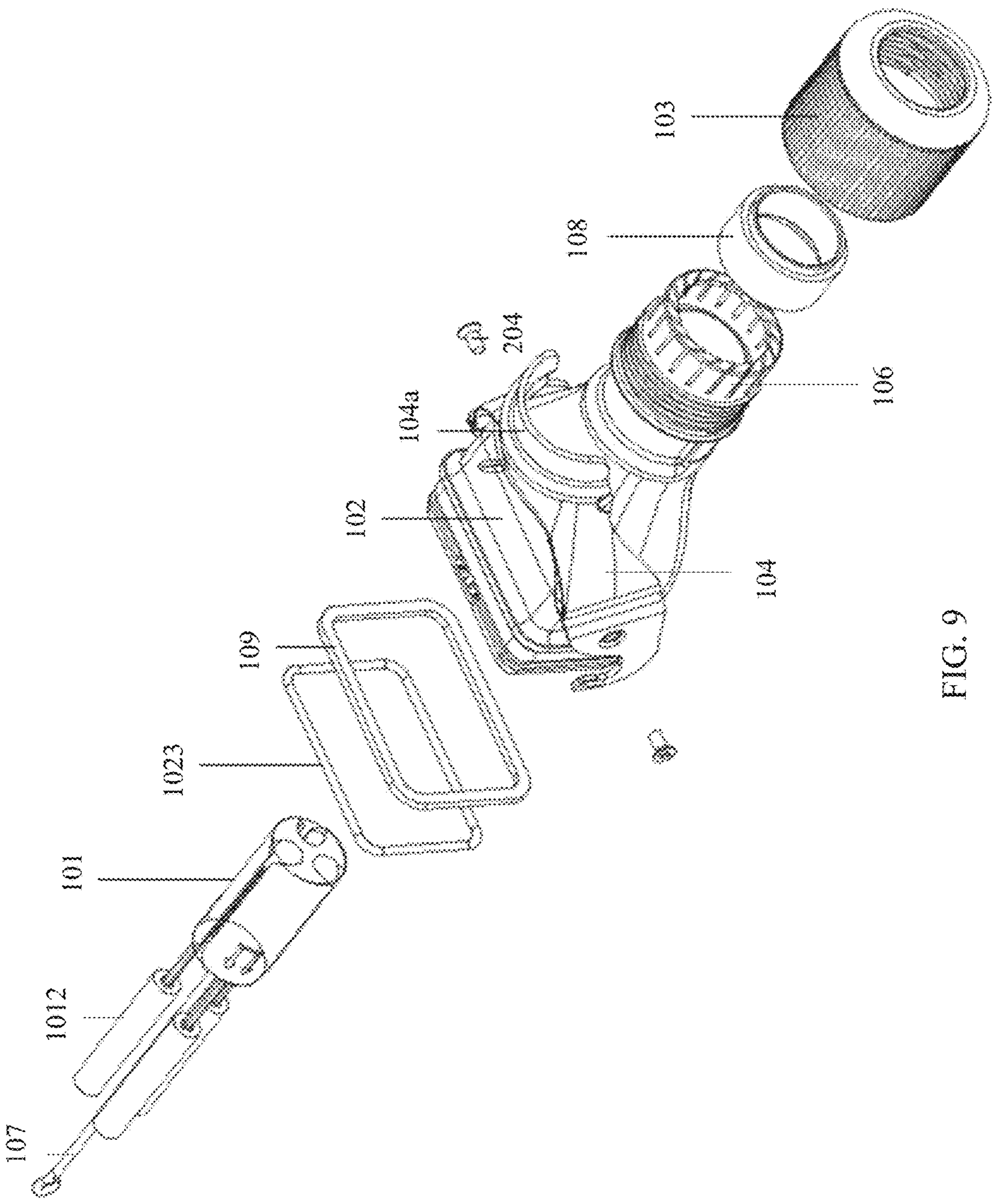
FIG. 9 is an exploded schematic structural diagram of a sleeve assembly according to an embodiment of the present invention.

In some embodiments of the present invention, referring to FIG. 9, FIG. 9 is an exploded schematic structural diagram of a sleeve assembly according to an embodiment of the present invention. The sleeve assembly further includes: a lining 108. The lining 108 is located in the bolt head 1024 on the sleeve body 102. The sealing rubber plug 101 passes through the lining 108 and then enters the locking nut 103 when the locking nut 103 is being tightened. The lining 108 is located in internal space of the bolt head 1024, and the lining 108 is sleeved onto the sealing rubber plug 101. The lining 108 can implement sealing protection for the cable. In actual application, the lining 108 may be a rubber lining or may be made of another material. No limitation is imposed herein.

In some embodiments of the present invention, as shown in FIG. 9, the sleeve assembly further includes: an elastic sealing gasket 109. The elastic sealing gasket 109 is disposed on the side of the end that is of the sleeve body 102 and on which the sealing ring is disposed. The elastic sealing gasket 109 is in contact with the cabinet sleeve after the cable connector is connected to the device connector. The elastic sealing gasket 109 is pressed between the sleeve body 102 and the cabinet sleeve after the fastening wrench 104 is rotated downwards and attached to the outer surface of the sleeve body 102. In this embodiment of the present invention, the elastic sealing gasket may be further disposed between the sleeve body on the sleeve assembly and the cabinet sleeve of the device. The elastic sealing gasket can be elastically compressed between the sleeve assembly and the cabinet sleeve, so that the sleeve body is in close contact with the cabinet sleeve by using the elastic sealing gasket. With the elastic sealing gasket disposed, the sleeve assembly provided in this embodiment of the present invention has better waterproof, dustproof, and salt spray-proof protection functions for cable routing.

In addition, it should be noted that, in some embodiments of the present invention, the rotating shaft may be specifically a screw. As shown in FIG. 9, the fastening wrench 104 and the sleeve body 102 are connected by using screws 204. By using the screws 204, the fastening wrench 104 is mounted to the sleeve body 102 on left and right surfaces that are of the sleeve body 102 and that are symmetrical to each other. The fastening wrench 104 can be rotated up and down around the sleeve body 102.

It can be learned from the description of the present invention in the foregoing embodiments that the sleeve assembly includes: the sealing rubber plug, the sleeve body, the locking nut, and the fastening wrench, where the sealing rubber plug includes the through hole and the pluggable stopper rod, and the cable can be mounted after the stopper rod is removed. The sleeve body has two opposite ends, a sealing ring is disposed on one end of the sleeve body, and a hollow bolt head is disposed on the other end of the sleeve body. The fastening wrench can be rotated up and down around the sleeve body, the hook is disposed on the fastening wrench, and the mounting ear is disposed on the cabinet sleeve. In the embodiments of the present invention, when the cable is being mounted, the cable that needs to be mounted first passes through the sleeve body, and then passes through the sealing rubber plug. Then the cable is connected to the device connector by using the cable connector. The sleeve assembly provided in the embodiments of the present invention can provide waterproof, dustproof, and salt spray-proof functions. The sleeve assembly is tightly connected to the cabinet sleeve of the device in the following manner: The fastening wrench is open before the cable is connected to the device connector by using the cable connector. After the cable connector is connected to the device connector, the sleeve body is inserted into the cabinet sleeve, and is sealed with the cabinet sleeve by using the sealing ring. The fastening wrench is rotated downwards and tightened. The hook on the fastening wrench is bonded to the mounting ear on the cabinet sleeve of the device. After the sleeve body is inserted into the cabinet sleeve, the sealing rubber plug enters the bolt head on the sleeve body. The locking nut is tightened to compress the sealing rubber plug, so as to implement protection after the cable is connected. In the embodiments of the present invention, the fastening wrench is used for sealing and connection between the sleeve assembly and the cabinet sleeve of the device, and the locking nut is used for sealing and connection between the cable and the sealing rubber plug. Because the sleeve body is separated from the cabinet sleeve of the device during cable connection in the embodiments of the present invention, mounting space for the sleeve body is not limited to a surface as the device. Therefore, according to the sleeve assembly provided in the embodiments of the present invention, cable mounting does not require that a mounting tool approaches the surface of the device, and excessively large space does not need to be occupied for the mounting operation. Therefore, the sleeve assembly provided in the embodiments of the present invention can meet a high-density cable routing requirement of the device. In addition, the through hole is disposed in the sealing rubber plug in the embodiments of the present invention. The through hole may be configured to have the cable arranged. When the through hole is not used, it can be sealed by using the stopper rod, so as to meet a requirement of subsequent capacity expansion with an additional cable.

For better understanding and implementation of the foregoing solutions in the embodiments of the present invention, the following uses a corresponding application scenario as an example for detailed description. The sleeve assembly provided in the embodiments of the present invention can meet a waterproof requirement for high-density cable routing, features extremely high mounting operation efficiency, and can resolve a problem of limited operation space. The following describes an example. Referring to FIG. 9. FIG. 9 is an exploded schematic structural diagram of a sleeve assembly according to an embodiment of the present invention. The sleeve assembly includes: a sleeve body 102, a fastening wrench 104, a sealing rubber plug 101, a locking nut 103, a sealing ring 1023, an elastic sealing gasket 109, a lining 108, and the like. The sleeve assembly provided in this embodiment of the present invention may have the following characteristics:

1. Implementation of cable sealing: A cable passes through the sealing rubber plug, and waterproof sealing is implemented by means of a tight connection between an internal thread of the locking nut and a bolt head on the sleeve body.

2. Implementation of a connection between the sleeve body and a cabinet sleeve: Sealing between the sleeve body and the cabinet sleeve is implemented by using the sealing ring and the elastic sealing gasket, and a hook on the fastening wrench is bonded to a mounting ear. The sleeve body and the cabinet sleeve are assembled in a sleeve interconnection form, and this provides a waterproof sealing function in a radial direction and on an end face.

3. Implementation of sealing for 1-n cables: Multiple through holes are disposed in the sealing rubber plug, and when a quantity of cables is less than a quantity of the through holes, a stopper rod is inserted into a free through hole on the sealing rubber plug to implement waterproof sealing. The sealing rubber plug is scalable, and therefore, an interconnection and sealing between one or more cables passing through the sleeve body and a device connector can be implemented.

4. Implementation of foolproof and anti-falling functions: After the fastening wrench is tightly closed, the locking nut blocks a foolproof edge on the fastening wrench, so as to prevent the fastening wrench from being opened by accident. The fastening wrench can be opened or closed only after the locking nut is completely opened. The sealing rubber plug is connected to the sleeve body by using an anti-falling chain for a rubber plug and the stopper rod to prevent falling. A flange is disposed on the sleeve body, and a convex rib is disposed in the locking nut. Assembly of the flange and the convex rib prevents the locking nut from falling from the sleeve body.

The locking nut has both a locking function and a function of preventing accidental disassembly. The fastening wrench can be opened, and then the sleeve body can be removed only after the locking nut is completely opened. Because the foolproof edge on the fastening wrench is pressed into the locking nut, the foolproof edge can be exposed, and then the fastening wrench can be opened only after the locking nut is unscrewed. This prevents the device connector and a cable connector from being pulled and damaged when the cable is clamped. The hook is connected to the mounting ear on the cabinet sleeve. The hook and the cabinet sleeve may be further protected by using a special sprayed coating, for example, by using a plastic coating or a metal lining, so that the bonding between the hook and the mounting ear provides an enhanced anti-corrosion capability. In addition, bonding design of the hook and the mounting ear may further implement operation feedback. The hook may be designed in a half-moon shape and provides feedback after being properly connected and mounted to a cabinet.

5. Cable mounting sequence: Cable→Pass through the sleeve body→Pass through the sealing rubber plug→Connect to the device connector→Insert the cable connector on the sleeve body into the device connector on the cabinet sleeve→Insert the sleeve assembly into the cabinet sleeve→Bond the hook on the fastening wrench to the mounting ear→Tighten the locking nut.

6. Cable removal sequence: reverse to the mounting sequence.

It can be learned from the foregoing example of the present invention that, compared with a conventional PG waterproof connector, in the embodiments of the present invention, cable routing efficiency can increase by more than 50% in space with a same width. The sleeve assembly is in an unconnected state when the cable is inserted or removed. The sleeve assembly is mounted after the cable is mounted. Therefore, operation space can be freed up. In the embodiments of the present invention, onsite cable mounting efficiency can be greatly improved, and multiple cables can be mounted with a single operation. One sleeve assembly can implement waterproof, dustproof, high temperature resistance, and low temperature resistance protection for multiple different device connectors and cables. The sleeve assembly provided in the embodiments of the present invention is designed in an integrated manner, and no parts are separated in the whole mounting procedure. This prevents parts from falling during working at heights, effectively implements anti-falling and foolproof functions, and meets a requirement of working at heights.

It should be noted that, to make the description brief, the foregoing apparatus embodiments are expressed as a combination of a series of modules and units. However, persons skilled in the art should appreciate that the present invention is not limited to the described module and unit sequence, because according to the present invention, some modules may be replaced with other modules and units. In addition, persons skilled in the art should also appreciate that the embodiments described in this specification all belong to preferred embodiments, and the used modules and units are not necessarily mandatory to the present invention.

In addition, it should be noted that the described apparatus embodiments are merely examples. The units described as separate parts may or may not be physically separate, and parts displayed as units may or may not be physical units, may be located in one position, or may be distributed on multiple units. Some or all the modules may be selected according to actual needs to achieve the objectives of the solutions of the embodiments.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A sleeve assembly to connect a cable using a cable connector to a device connector disposed in a cabinet sleeve of a device, wherein the sleeve assembly comprises:

a sealing rubber plug;
a sleeve body;
a locking nut; and
a fastening wrench, the sealing rubber plug comprises: a rubber plug body, wherein a through hole is disposed in the rubber plug body, and the cable that is to be inserted into the device is to be inserted into the through hole;

the sleeve body has two opposite ends, a sealing ring is disposed on one end of the sleeve body, and a hollow bolt head is disposed on the other end of the sleeve body;

the fastening wrench is disposed on an outer surface of the sleeve body, the fastening wrench and the sleeve body are connected by using a rotating shaft, a hook is disposed on the fastening wrench;

the cable is to be inserted into the sleeve body from a side of the other end on which the hollow bolt head is disposed, and protrudes from the sleeve body on a side of the one end on which the sealing ring is disposed, the cable is to pass through the through hole in the sealing rubber plug after protruding from the sleeve body, and the cable is to be connected, by using the cable connector, to the device connector disposed in the cabinet sleeve after protruding from the sealing rubber plug;

the fastening wrench is separated from the outer surface of the sleeve body before the cable is to be connected to the device connector by using the cable connector, the sealing ring on the sleeve body is in contact with the cabinet sleeve after the cable connector is connected to the device connector, and after the fastening wrench is rotated towards the outer surface of the sleeve body, the fastening wrench is attached to the outer surface of the sleeve body, and the hook is bonded to a mounting ear disposed on the cabinet sleeve; and the sealing ring on the sleeve body is in close contact with the cabinet sleeve after the fastening wrench is attached to the outer surface of the sleeve body; and the sealing rubber plug enters the bolt head on the sleeve body after the cable passes through the through hole in the sealing rubber plug, the locking nut is tightened by a coordinated connection between an internal thread of the locking nut and an external thread of the bolt head, the locking nut tightly wraps the sealing rubber plug after the locking nut is tightened, and a part of the sealing rubber plug protrudes from the locking nut.

2. The sleeve assembly according to claim 1, wherein the sealing rubber plug further comprises a stopper rod, the stopper rod is connected to the through hole in a pluggable manner, and the cable is to be inserted into the through hole after the stopper rod is removed from the through hole.

3. The sleeve assembly according to claim 2, wherein at least two through holes are disposed on the rubber plug body, a quantity of cables that are inserted into the sleeve assembly is less than or equal to a quantity of the through holes, each cable is arranged in one through hole, a free through hole exists when the quantity of the cables is less than the quantity of the through holes, and the stopper rod is arranged in the free through hole.

4. The sleeve assembly according to claim 2, wherein the sleeve assembly further comprises:

an anti-falling chain for a stopper rod;

the anti-falling chain for a stopper rod is separately connected to the stopper rod and the sealing rubber plug; and the anti-falling chain for a stopper rod is configured to: when the stopper rod is removed from the sealing rubber plug, connect the removed stopper rod and the sealing rubber plug.

5. The sleeve assembly according to claim 1, wherein a foolproof edge is further disposed on the fastening wrench;

the foolproof edge is attached to an outer surface that is of the sleeve body and that is adjacent to the side of the other end on which the hollow bolt head is disposed after the cable is connected to the device connector by using the cable connector; and the foolproof edge is pressed against an inner surface of the locking nut when the locking nut is tightened by the coordinated connection between the internal thread of the locking nut and the external thread of the bolt head, the foolproof edge is detached from the inner surface of the locking nut after the locking nut is separated from the bolt head, and the fastening wrench can be pulled open from the outer surface of the sleeve body.

6. The sleeve assembly according to claim 1, wherein the sleeve body comprises:

a hollow tube structure surrounded by an upper surface, a left surface, a lower surface, and a right surface;

the fastening wrench is a U-shaped structure, the fastening wrench comprises: a left hook portion, a right hook portion, and a wrench body, the wrench body is separately and fixedly connected to the left hook portion and the right hook portion, and hooks are disposed on both the left hook portion and the right hook portion; and the left hook portion and the left surface of the sleeve body are connected by using a rotating shaft, and the right hook portion and the right surface of the sleeve body are connected by using a rotating shaft.

7. The sleeve assembly according to claim 6, wherein the foolproof edge is disposed on the wrench body.

8. The sleeve assembly according to claim 1, wherein the fastening wrench is a long-strip-shaped sheet structure, the hook is disposed on a front end of the fastening wrench, and the fastening wrench and the outer surface of the sleeve body are connected by using a rotating shaft.

9. The sleeve assembly according to claim 1, wherein the hollow bolt head on the sleeve body is outwardly connected to a soft claw, the sealing rubber plug enters the soft claw when the locking nut is tightened, and the soft claw is compressed by the locking nut when the bolt head is screwed into the locking nut.

10. The sleeve assembly according to claim 1, wherein the sleeve assembly further comprises:

a lining; and the lining is located in the hollow bolt head on the sleeve body, and the sealing rubber plug passes through the lining and then enters the locking nut when the locking nut is being tightened.

11. The sleeve assembly according to claim 1, wherein the sleeve assembly further comprises:

an elastic sealing gasket; and the elastic sealing gasket is disposed on the side of the one end that is of the sleeve body and on which the sealing ring is disposed, the elastic sealing gasket is in contact with the cabinet sleeve after the cable connector is connected to the device connector, and the elastic sealing gasket is pressed between the sleeve body and the cabinet sleeve after the fastening wrench is rotated downwards and attached to the outer surface of the sleeve body.

12. The sleeve assembly according to claim 1, wherein the sleeve assembly further comprises:

an anti-falling chain for a rubber plug;

a hanging hole is disposed on an outer surface that is of the sleeve body and close to the sealing ring; and the anti-falling chain for a rubber plug is connected to the sealing rubber plug, and the anti-falling chain for a rubber plug is hung in the hanging hole on the sleeve body.

13. The sleeve assembly according to claim 1, wherein a convex rib is disposed on the inner surface of the locking nut;

a flange is further disposed on the side of the end on which the hollow bolt head is disposed on the outer surface of the sleeve body; and the locking nut is clamped, by using the flange and the convex rib, to the side of the one end that is of the sleeve body and on which the hollow bolt head is disposed.

* * * * *